Jan. 16, 1968    D. J. ERICKSON    3,363,453
PURE FLUID SENSOR
Filed Dec. 12, 1966
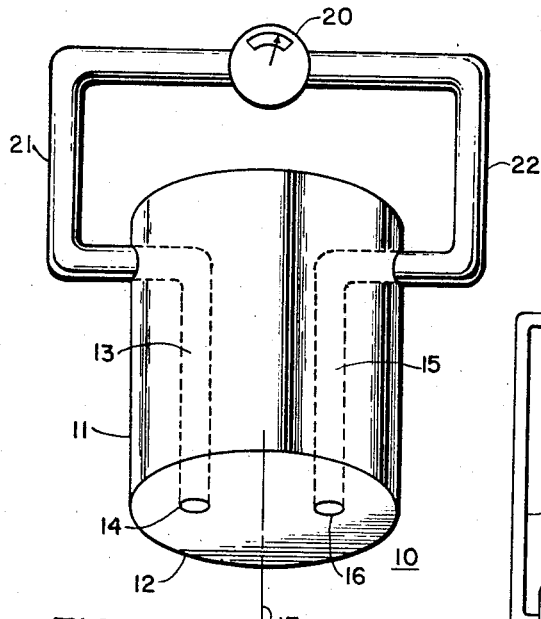
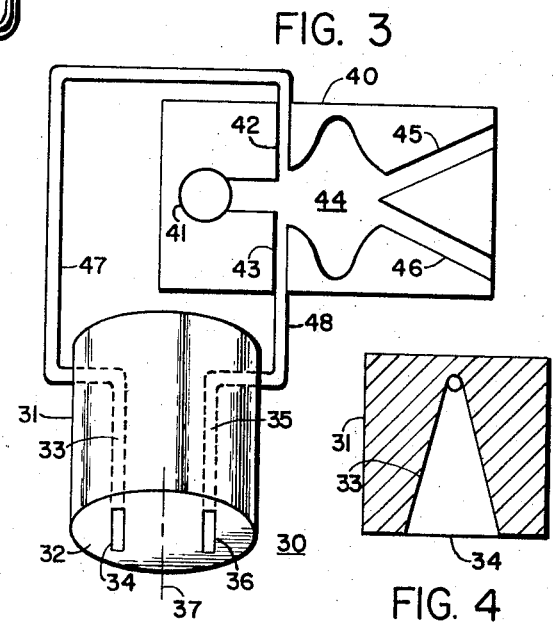
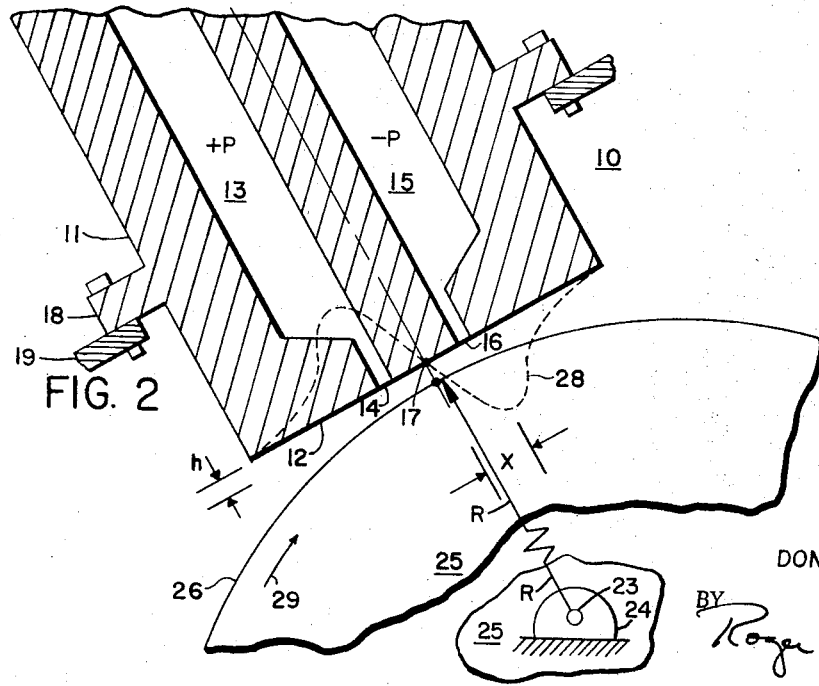
INVENTOR.
DONALD J. ERICKSON
BY Roger W. Jensen
ATTORNEY

United States Patent Office 3,363,453
Patented Jan. 16, 1968

3,363,453
PURE FLUID SENSOR
Donald J. Erickson, Minneapolis, Minn., assignor to Honeywell Inc., Minneapolis, Minn., a corporation of Delaware
Continuation-in-part of application Ser. No. 352,269, Mar. 16, 1964. This application Dec. 12, 1966, Ser. No. 617,734
2 Claims. (Cl. 73—54)

ABSTRACT OF THE DISCLOSURE

A pure fluid device comprising a stationary member having a plane surface containing two pressure ports which are located in proximity to a body of revolution. Rotation of the body of revolution in a fluid environment results in hydrodynamic pumping which produces a positive pressure at one port and a negative pressure at the other port. The pressure differential produced at the two ports is indicative of the angular velocity of the rotating body or the viscosity or temperature of the working fluid.

---

This application is a continuation-in-part of my co-pending application Ser. No. 352,269 filed Mar. 16, 1964, for a Pure Fluid Sensor, now abandoned.

This invention pertains to pure fluid sensors, and more particularly pure fluid velocity, viscosity or temperature sensors. A pure fluid device is defined for purposes of the application as a device having absolutely no moving parts other than the working medium (fluid).

Since the discovery of pure fluid technology, various control systems have been investigated to determine the applicability of pure fluid thereto. Pure fluid systems are attractive because of their high reliability and low cost. Pure fluid systems also possess exceptional environmental tolerance. For example, the operating temperature and radiation tolerance of a pure fluid device is limited only by the fabrication materials. Pure fluid systems also permit simpler fabrication techniques than those possible with conventional control systems.

The applicant has provided the pure fluid sensor which in one embodiment provides an output signal indicative of the angular velocity of a body of revolution. The output signal may also be indicative of the viscosity of a fluid, or the ambient temperature of the sensor. When utilized as a speed sensor, the applicant's pure fluid sensor provides an output signal which is substantially independent of ambient pressure and surface roughness. One particular application of the applicant's unique pure fluid speed sensor is in a pure fluid control system for a turbojet engine, however, it is not limited to this application.

The scope of the applicant's invention will become apparent from a study of the accompanying specification and claims in conjunction with the drawings in which:

FIGURE 1 is a schematic representation of one embodiment of the applicant's unique pure fluid sensor;

FIGURE 2 is an enlarged schematic representation of the applicant's sensor;

FIGURE 3 is a schematic representation of another embodiment of the applicant's sensor; and FIGURE 4 is a partial cross-section view of the embodiment illustrated in FIGURE 3.

Referring now to FIGURE 1, reference numeral 10 generally depicts the applicant's unique pure fluid sensor. A cylindrical housing means 11 is provided having a planar surface 12 on one end thereof. A first fluid passage 13 is provided within means 11. One end of passage 13 intersects with planar surface 12 so as to form a circular orifice 14. A second fluid passage 15 is provided within housing means 11. One end of passage 15 intersects planar surface 12 so as to form a circular orifice 16. It will be noted that orifice 14 and orifice 16 are spaced apart and are positioned on either side of an axis 17 lying in the plane of the surface 12. Orifice 14 and orifice 16 are both positioned a distance X from axis 17 (see FIGURE 2).

An output means 20 is also provided. In the particular embodiment of the applicant's pure fluid sensor illustrated in FIGURE 1, the output means 20 comprises a differential pressure sensor which produces an output signal indicative of the differential pressure sensed. The other end of fluid passage 13 is connected to output means 20 by means of a conduit 21. The other end of fluid passage 15 is connected to output means 20 by means of a fluid conduit 22.

FIGURE 2 is an enlarged schematic representation of the applicant's pure fluid sensor illustrated in FIGURE 1. Like reference numerals will be utilized in FIGURE 2 to identify the components described with reference to FIGURE 1. Housing means 11, planar surface 12, fluid passage 13, orifice 14, fluid passage 15, and orifice 16 are illustrated in FIGURE 2. Housing means 11 has a flange 18 thereon which is rigidly attached to stationary mounting means 19. Mounting means 19 functions to mount housing means 11 such that surface 12 is contiguous to a rotating body of revolution. Reference numeral 25 identifies a body of revolution (partially broken away) having a radius R. Body 25 is supported by any suitable bearings (not shown) in stationary support 24 and is rotatable about its axis of revolution 23 which is perpendicular to the plane of the drawing of FIGURE 2. Body 25 may be rotated about axis 23 by any suitable means (not shown). The means for rotating body 25 may, for example, be a turbojet engine. It should be noted, however, that it is not necessary for body 25 to be separate from the means by which it is rotated. For example, body 25 may be the shaft which carries the turbine and/or compressor in a turbojet engine. The axis of rotation of body 25 is parallel to axis 17 which lies in the plane of surface 12. A point of minimum clearance between surface 12 and periphery 26 of body 25 is located on axis 17. The minimum clearance between body 25 and planar surface 12 is indicated by reference symbol $h$. In one successful embodiment of the applicant's unique sensor $h$ equals .0005 inch.

Upon rotation of body 25 about axis 23 with an angular velocity direction indicated by the arrow identified by reference numeral 29, a hydrodynamic pumping action occurs between sensor 10 and body 25. Theoretical analysis and experimentation has shown that a pressure build up occurs ahead of axis 17 and a vacuum develops behind axis 17. A pressure profile is superimposed upon FIGURE 2 and is identified by reference numeral 28. The pressure build up is proportional to the angular velocity $\omega$ of body 25 and the viscosity of the fluid therebetween (for example air). The pressure build up is also a function of the minimum clearance $h$ between planar surface 12 and periphery 26 of body 25 and a function of the radius R of body 25. This relationship is indicated in the following formula:

$$P_{\max.} = \frac{K\omega\mu}{m^{1.5}} \text{ at } X = R\sqrt{\tfrac{2}{3}m}$$

where $P_{\max.}$ equals the peak gauge pressure and vacuum developed, K is the constant and equals .92 for the embodiment illustrated, $\omega$ equals the angular velocity of body 25 in radians per second, $\mu$ equals the fluid dynamic viscosity, $h$ equals the minimum clearance between planar surface 12 and periphery 26 of body 25, R equals the radius of body 25, $m$ equals the clearance modulus $h/R$, and X equals the distance from axis 17 to the pressure and vacuum peaks. Thus orifice 14 and orifice 16 are positioned a distance X from axis 17 so as to obtain a maximum signal output. As the formula indicates, the distance X is a function of the radius of body 25 and the clearance $h$ between body 25 and planar surface 12.

The positive pressure which builds up in passage 13 is indicated by the symbol $+P$ in FIGURE 2. The negative pressure developed in passage 15 is identified by reference symbol $-P$ in FIGURE 2. The pressure differential between passages 13 and 15 is conveyed through conduits 20, 21 respectively to output means 20. As indicated by the formula above, the output differential pressure signal is independent of ambient pressure levels. In addition, the surface roughness of body 25 does not effect the boundary layer pressure build up so that the output signal is also independent of surface condition.

As indicated by the formula, a differential pressure output signal is obtained from the applicant's unique pure fluid sensor which is indicative of the angular velocity $\omega$ of body 25. Thus the applicant's sensor may be utilized as a pure fluid speed sensor. It is evident from the formula that the differential pressure output signal of the sensor is also indicative of the dynamic viscosity $\mu$ of the fluid. Therefore, if the parameters of speed, temperature (which effects dynamic viscosity $\mu$ and clearance $h$), clearance $h$, and radius R are held constant, the applicant's sensor may be utilized to sense fluid viscosity. In addition, if the parameters of speed and R are held constant, the differential pressure output signal is indicative of temperature because of the effect of the temperature upon the viscosity and clearance (if body 25 and housing 11 are fabricated of materials having different coefficients of expansion).

When the applicant's sensor is utilized as a speed sensor or viscosity sensor and a range of temperatures is expected it is necessary to negative the effects of temperature upon the differential pressure output signal. This is accomplished by designing the coefficients of expansion of housing means 11 and body 25 to vary the clearance $h$ to compensate for variations in viscosity due to temperature.

In various pure fluid control systems, it is necessary to utilize the signal of the sensor to initiate corrective action. For example, if the sensor is utilized as a device in a speed limiting control loop, the output signal of the speed sensor is utilized to control the means generating the angular velocity of the body. A typical example would be a pure fluid control system for a turbojet engine. FIGURE 3 illustrates an alternate embodiment of the applicant's invention adapted to perform this function. The sensor is identified by reference numeral 30. A cylindrical housing means 31 is provided having a planar surface 32 on one end and thereof. An expanding passage 33 is provided within housing 31, one end of which intersects with planar surface 32 so as to form an elongated orifice 34. The length of orifice 34 is better illustrated with reference to FIGURE 4. An elongated orifice is necessary because of the demands of increased fluid flow when sensor 30 is connected in a pure fluid control system. The amount of fluid flow available is dependent upon the area of orifice 34. Referring to FIGURE 2, the pressure profile illustrated extends perpendicular to the plane of the drawing as far as the surface 12 and surface 26 extend contiguous one another. Thus, it is clear that by extending the dimension of the orifice in this direction more fluid flow is obtained. An expanding fluid passage 35 is also provided within housing 31, one end of passage 35 intersects with planar surface 32 so as to form an elongated orifice 36. It will be noted that orifice 34 and orifice 36 are spaced apart and positioned on either side of and parallel to a first axis 37. Axis 37 lies in the plane of planar surface 32.

An output means 40 is also provided. Output means 40 in this particular embodiment comprises a proportional pure fluid amplifier. Pure fluid amplifier 40 comprises a supply nozzle 41, a first control passage 42 and a second control passage 43, an interaction chamber 44, a first output leg 45, and a second output leg 46. Passage 33 is connected to control passage 42 by means of fluid conduit 47. Fluid passage 35 is connected to control passage 43 by fluid conduit 48.

Sensor 30 functions in a manner similar to speed sensor 10, and thus the operation thereof need not be described in detail. The shape of orifices 34 and 36 allow a greater fluid flow therethrough so as to operate fluid amplifier 40. The differential pressure signal provided by sensor 30 is applied across control passages 42 and 43 of fluid amplifier 40. Thus the output signal of fluid amplifier 40 is indicative of the angular velocity of a body of revolution positioned contiguous with planar surface 32 along axis 37. The output signal is at a higher magnitude, that is it is amplified by fluid amplifier 40 and is utilized by the control system to initiate appropriate control action. This embodiment may be utilized to sense viscosity or temperature also.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. A pure fluid sensor comprising:
   housing means having a planar surface thereon;
   said housing means having a first fluid passage therein, one end of said first passage intersecting with said surface and forming a first orifice;
   said housing means having a second fluid passage therein, one end of said second fluid passage intersecting with said surface and forming a second orifice, said first orifice and said second orifice being spaced apart and positioned on either side of a first axis;
   mounting means for mounting said housing means so that said surface is positioned a distance $h$ from the periphery of a body of revolution having a radius R, said body of revolution being rotatable about its axis of revolution, the direction of said first axis being substantially parallel to the direction of said axis of revolution, said first and said second orifices being positioned a distance equal to $\tfrac{2}{3}hR$ on either side of said first axis; and
   output means responsive to the difference in pressure between said first orifice and said second orifice, said output means being operable to provide a signal indicative of the difference in pressure between said first orifice and said second orifice.

2. The pure fluid sensor of claim 1 wherein:
   said first and second orifices are elongated in cross section and are parallel to said first axis; and
   said output means is a proportional fluid amplifier means.

References Cited

UNITED STATES PATENTS 2,982,902  5/1961  Le Gates et al.
3,111,838  11/1963  Bucalo _____ 73—53

FOREIGN PATENTS 1,160,652  1/1964  Germany.

LOUIS R. PRINCE, *Primary Examiner.*

D. O. WOODIEL, *Assistant Examiner.*